(12) United States Patent
Ehara (10) Patent No.: US 6,862,514 B2
(45) Date of Patent: Mar. 1, 2005

(54) MODEL GENERATING METHOD, MODEL GENERATING PROGRAM, AND SIMULATION APPARATUS

(75) Inventor: Masato Ehara, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/703,550

(22) Filed: Nov. 10, 2003

(65) Prior Publication Data

US 2004/0102891 A1 May 27, 2004

(30) Foreign Application Priority Data

Nov. 27, 2002 (JP) ........................................ 2002-343326

(51) Int. Cl.[7] .............................................. G06F 17/17
(52) U.S. Cl. ......................... 701/102; 703/14; 73/117.3
(58) Field of Search ........................ 701/102; 73/117.3; 703/14, 19; 716/6

(56) References Cited

U.S. PATENT DOCUMENTS

| | | | | |
|---|---|---|---|---|
| 4,660,535 A | | 4/1987 | Asano | 123/406.21 |
| 5,094,213 A | * | 3/1992 | Dudek et al. | 123/406.65 |
| 5,577,474 A | * | 11/1996 | Livshiz et al. | 123/352 |
| 5,611,311 A | | 3/1997 | Tomisawa | 123/406.47 |
| 6,090,152 A | | 7/2000 | Hayes et al. | 703/19 |
| 6,481,423 B2 | * | 11/2002 | Muller et al. | 73/117.3 |

FOREIGN PATENT DOCUMENTS

| | | |
|---|---|---|
| EP | 1 020 624 A2 | 7/2000 |
| GB | 2 187 001 A | 8/1987 |
| JP | A 5-61680 | 3/1993 |
| JP | A 7-98603 | 4/1995 |
| JP | A 9-142280 | 6/1997 |
| JP | A 2000-321174 | 11/2000 |
| JP | A 2002-2530 | 1/2002 |

OTHER PUBLICATIONS

James Yang; "Designing an Adaptive Automotive Control System to Optimize 4–stroke SI Engine Performance"; Logic and Computation; Senior Thesis 2002; pp 1–38.

* cited by examiner

*Primary Examiner*—Hieu T. Vo
(74) *Attorney, Agent, or Firm*—Oliff & Berridge PLC (57) ABSTRACT

The present invention is directed to reduce the number of measuring processes of an actual apparatus. A final model for estimating the behavior of an engine 3 is generated by the following procedure. First, a simulation model in which physical properties of the engine 3 are considered is set. Next, measurement is roughly performed by an actual apparatus. Based on the difference between the simulation data and the measurement data, a correction function is Err, 130 derived. By combining the physical model and the correction function Err, 130, a final model is obtained. By using the final model, a final adaptive value is determined.

10 Claims, 6 Drawing Sheets

MODEL GENERATING METHOD, MODEL GENERATING PROGRAM, AND SIMULATION APPARATUS

BACKGROUND OF THE INVENTION

1. Field of the Invention

The present invention relates to a model generating method, a model generating program, and a simulation apparatus for generating a model of estimating the state of an object.

2. Description of the Related Art

If a physical model of an object can be obtained accurately, the object can be controlled at high precision by performing a required operation so as to be adapted to a purpose. In an actual object, however, various elements are related to each other complicatedly, so that it is often difficult to construct an accurate physical model. A technique of deriving a function indicative of input/output characteristics by using an exponential function approximation method based on measurement data obtained by measuring the input/output characteristics of the object is known (for example, Japanese Patent Application Laid-Open JP-A No. 2000-321174, claim 1 and paragraph number 0009).

A technique of preparing a physical model and adjusting parameters of the model so as to eliminate a difference between an output from the model and an output obtained from the actual object is also known (for example, JP-A No. 9-142280, FIG. 3).

In the technique described in JP-A No. 2000-321174, the input/output characteristics are approximated by a statistical method such as the exponential function approximate method. The measurement data is sampled discretely, so that the behavior of an object between a certain measurement point and the next measurement point is not reflected in the model. Therefore, it is difficult to construct an accurate model. The technique is inconvenient, for the number of measurement processes increases, when the number of measurement points is increased to improve precision of the model.

In the technique disclosed in JP-A No. 9-142280, it is necessary to adjust parameters of a physical model. In the case of modeling an object in which various elements are related to each other complicatedly, it is not easy to determine a control rule of the parameters, that is, to determine which parameter should be changed and how much degree of the change. Even if the parameter control rule is obtained, to obtain an accurate physical model, it is necessary to measure a number of measurement points and execute an enormous amount of calculation. Therefore, the technique described in JP-A No. 9-142280 has problems such that it takes long time to obtain measurement data and a calculation load is heavy.

SUMMARY OF THE INVENTION

An object of the invention is, therefore, to provide a model generating method and a model generating program capable of generating a model indicative of the behavior of an object by a simple method having a reduced number of measuring processes, and a simulation apparatus using the model generating method and the model generating program.

A model generating method according to the invention is the one for generating a model to estimate a state of an object under a predetermined control condition, including the steps of: calculating error data indicative of a difference between actual measurement data obtained by measuring a state of the object corresponding to input data and simulation data obtained by inputting the input data to a physical model in which physical properties of the object are considered; deriving a correction function for correcting the simulation data so as to be close to the actual measurement data based on a change in the error data corresponding to the input data; and generating a final model of the object by combining the physical model and the correction function.

According to the invention, the base for generating a final model is a physical model. Since physical properties of an object are considered in the physical model, even if actual measurement data and simulation data do not match perfectly, the tendencies of the behavior of the object almost coincide with each other. Since a change in error data corresponding to input data expresses the tendency of the error, based on the change, a correction function properly correcting the simulation data can be derived. Thus, the number of processes for actually measuring the object in order to obtain a final model can be greatly reduced. As a result, even when an object is large-scaled and complicated, a model of the object can be generated in a short time.

The object includes a mechanical object, an electrical object, and a chemical object. Examples of the object are an engine as a drive source of a vehicle, a chemical plant, and the like. The control condition is an input of an object to be controlled. For example, when the object is an engine, the control condition is an operating condition of the engine. Although the model generating method is based on the precondition that a physical model of an object is obtained in advance in some way, the method may include a step of setting the physical model of the object.

Preferably, the step of deriving the correction function includes the steps of: determining a form of the correction function including at least one parameter based on a change in the error data corresponding to the input data; and determining a value of the parameter so that correction data obtained by inputting the simulation data to the correction function comes close to the actual measurement data. In this case, the form of the correction function is determined and, after that, the value of the parameter is determined. For example, when the correction function is given as a polynomial, the form of the correction function is each term included in the polynomial. Preferably, the value of the parameter is determined by a statistical process such as the least-squares method.

A simulation apparatus according to the invention is the one to generate a model to estimate a state of an object under a predetermined control condition, including: an error data generating device for calculating error data indicative of a difference between actual measurement data obtained by measuring a state of the object corresponding to input data and simulation data obtained by inputting the input data to a physical model in which physical properties of the object are considered; a correction function generating device for generating a correction function to correct the simulation data so as to come close to the actual measurement data based on a change in the error data corresponding to the input data; and a final model generating device for generating a final model of the object by combining the physical model and the correction function.

According to the invention, by combining a correction function with a physical model as a base, a final model is generated. Since physical properties of an object are considered in the physical model, even if the number of measurement points is small, a proper correction function can be derived. Thus, the number of processes for actually measuring the object in order to obtain a final model can be greatly reduced. As a result, even when an object is large-scaled and complicated, a model of the object can be generated in a short time.

Preferably, the correction function generating device includes: a presenting device for presenting a change in the error data corresponding to the input data to a user and prompting the user to enter a form of the correction function; an input device for outputting an output signal according to an operation of the user; and a parameter determining device for specifying the form of the correction function including at least one parameter based on the output signal and determining a value of the parameter so that correction data obtained by inputting the simulation data to the correction function becomes close to the actual measurement data. In this case, a change in error data is presented to the user, so that useful information for determining the form of the correction function can be provided to the user.

Preferably, the correction function generating device stores a form of the correction function which is predetermined and includes at least one parameter, and determines a value of the parameter so that correction data obtained by inputting the simulation data to the correction function comes close to the actual measurement data. In this case, since the form of the correction function is preliminarily determined, a final model can be generated automatically. The simulation apparatus is useful in the case where the form of the correction function for a similar object is already obtained.

Preferably, the correction function generating device determines a form of the correction function including at least one parameter by a predetermined computation based on a change in the error data corresponding to the input data, and determines a value of the parameter so that correction data obtained by inputting the simulation data to the correction function comes close to the actual measurement data. In this case, the form of the correction function can be automatically determined based on a change in error data. The predetermined computation may be any computation as long as the tendency of an error is analyzed and the form of the correction function is determined. For example, a plurality variables which are factors of a control condition or combinations of the factors are specified, the variable of which correlation value with error data is higher than a predetermined reference value is selected, and a polynomial including terms each of which is constructed by a product of the selected variable and a parameter can be used as the form of a correction function.

Preferably, the simulation apparatus further includes an adaptation data generating device for inputting a control condition of the object to the final model and generating adaptation data indicative of the state of the object. By using adaptation data as a map, an object can be controlled. The number of pieces of the adaptation data generated by the adaptation data generating device is, preferably, larger than the number of measurement points at which the actual measurement data is measured. Since the final model is obtained by correcting the physical model as a base, the behavior of the object between measurement points can be estimated with high precision. Consequently, there is no problem if the number of adaptation data to be used for actual control is larger than the number of measurement data to be used for generating a final model, and the number of processes for measuring the object can be greatly reduced.

In the simulation apparatus, preferably, the object is an internal combustion engine for burning a fuel, and the control condition is an operating condition of the internal combustion engine. In this case, the final model is a model for predicting the behavior of the internal combustion engine under a predetermined operating condition. Obviously, the simulation apparatus may be a part of an engine control unit (ECU) for controlling the engine of a vehicle.

A model generating program according to the invention is the one for generating a model to estimate a state of an object under a predetermined control condition, which allows a computer to execute the steps of: calculating error data indicative of a difference between actual measurement data obtained by measuring a state of the object corresponding to input data and simulation data obtained by inputting the input data to a physical model in which physical properties of the object are considered; deriving a correction function to correct the simulation data so as to come close to the actual measurement data based on a change in the error data corresponding to the input data; and generating a final model of the object by combining the physical model and the correction function. According to the invention, the number of processes for actually measuring the object in order to obtain a final model can be greatly reduced. As a result, even when an object is large-scaled and complicated, a model of the object can be generated in a short time. The model generating program may be recorded on an information recording medium. The information recording medium corresponds to a ROM as a semiconductor device and the like as well as a CD-ROM.

DESCRIPTION OF THE PREFERRED EMBODIMENTS

To control an engine as an internal combustion engine to be mounted on a vehicle, it is necessary to know the behavior of the engine under predetermined operating conditions. Consequently, a controller for controlling combustion of a fuel in the engine prestores a map M indicative of the state of the engine with respect to each of various operating conditions. A control amount is generally determined with reference to the map M. To adapt a value of data stored in the map M to an actual behavior of the engine to be controlled is called adaptation. A data value stored in the map M is called an adaptive value. The embodiment relates to a map generating system for generating the map M by applying the simulation apparatus according to the invention.

Figure 1:
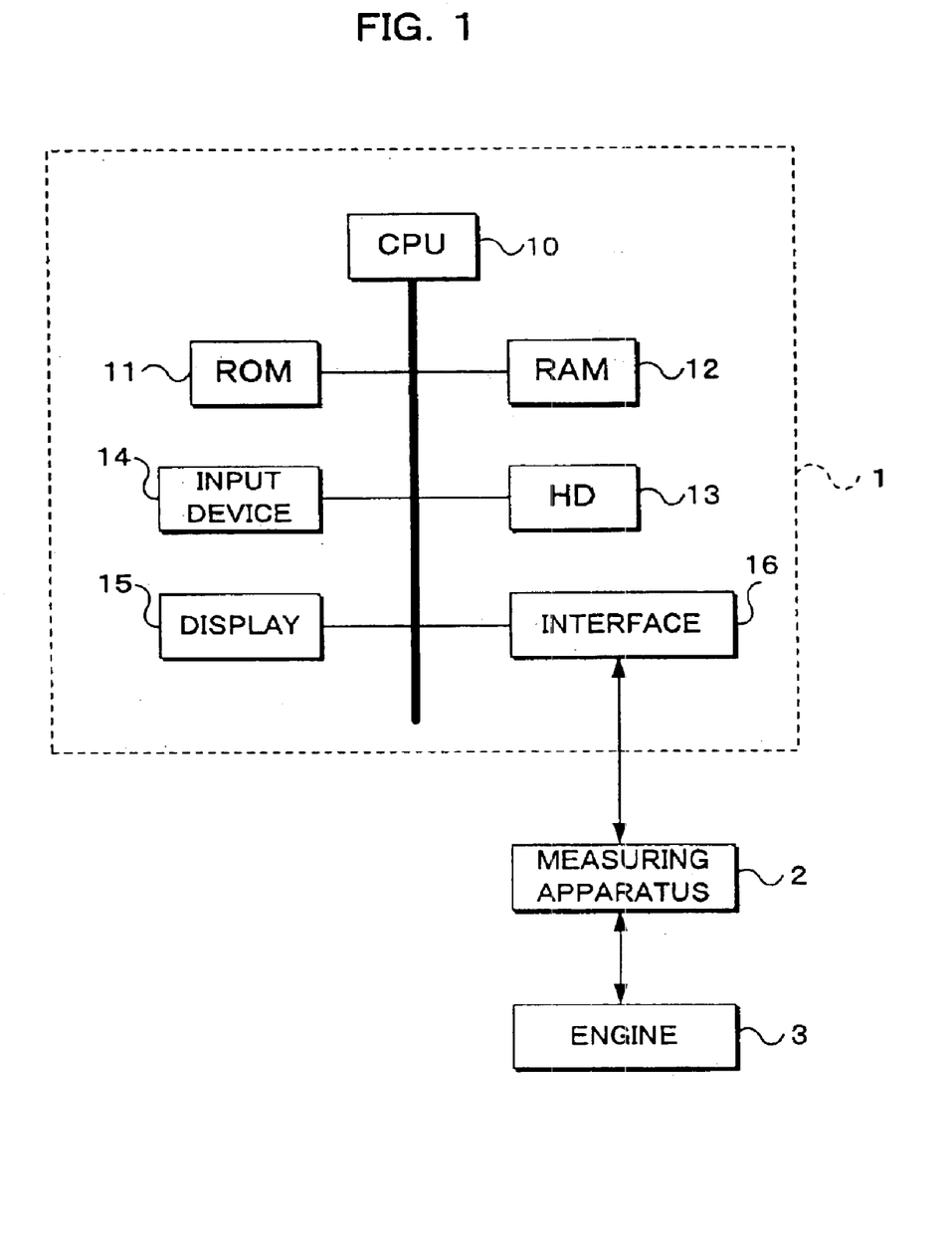
FIG. 1 is a block diagram showing a map generating system using a simulation apparatus according to the invention.

FIG. 1 is a block diagram of a map generating system using the simulation apparatus according to an embodiment of the invention. The map generating system has a computer 1, a measuring apparatus 2, and an engine 3 as an object to be controlled. To the engine 3, various sensors such as a temperature sensor, a torque sensor, and an intake sensor are attached. Output signal from each sensor is inputted to the measuring apparatus 2. The measuring apparatus 2 can control operation timings of an intake valve and an exhaust valve of the engine 3, a lift amount, opening of a fuel injection valve, and the like. The computer 1 and the measuring apparatus 2 are connected to each other. The measuring apparatus 2 operates the engine 3 under predetermined operating conditions in accordance with an instruction from the computer 1. The state of the engine 3 is measured with the various sensors. The measuring apparatus 2 generates measurement data based on output signals of the sensors and transmits the output signals to the computer 1.

The computer 1 has a CPU 10, a ROM 11, a RAM 12, a hard disk 13, an input device 14, a display 15, and an interface 16 which are connected to each other via a bus. The CPU 10 functions as a control center of the computer 1 and executes various programs such as a map generating program. In the ROM 11, a boot program executed at the time of start-up is stored. The RAM 12 functions as a work area of the CPU 10 and stores data which is being processed and the like. In the hard disk 13, a simulation model is stored. The simulation model is loaded to the RAM 12 by the CPU 10.

The input device 14 functions as input means by which the operator inputs an instruction, and outputs a signal according to the operation of the operator. The input device 14 includes, for example, a keyboard and a mouse. The interface 16 has a function of performing communication with an external device. The CPU 10 can transmit an instruction to the measuring apparatus 2 via the interface 16 and obtain measurement data from the measuring apparatus 2. Measurement data can be also accepted from another computer via the interface 16.

Figure 2:
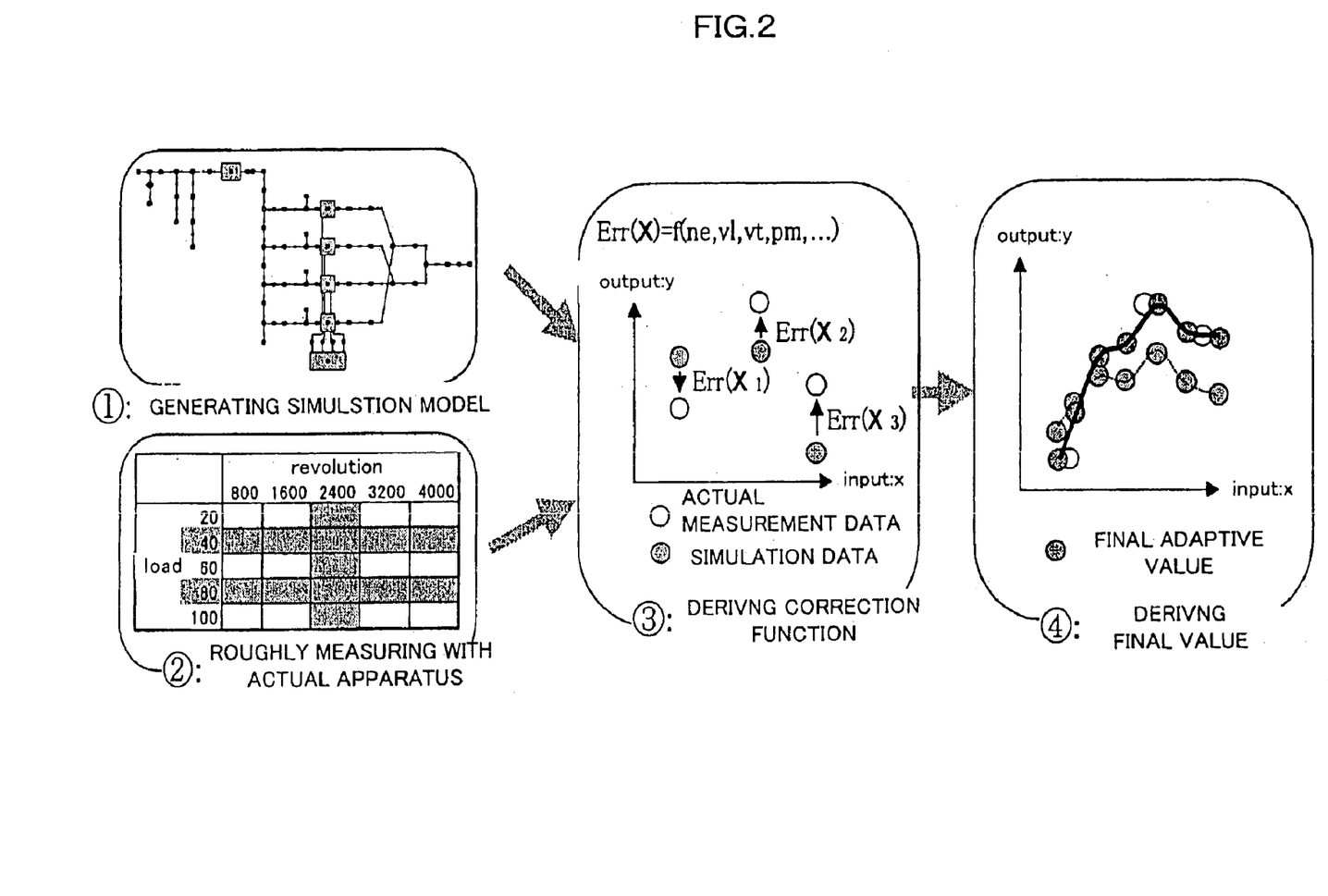
FIG. 2 is a conceptual diagram showing an outline of a procedure of deriving a final model in the map generating system.

FIG. 2 shows an outline of a procedure of deriving a final model in the map generating system. First, a simulation model is generated by the computer 1. The simulation model is given as a physical model in which physical properties of an object are considered.

Second, an actual apparatus is measured under predetermined operating conditions. In this measurement, measurement is not performed with respect to all operating conditions stored as a map M, but measurement points are roughly set. For example, a case is assumed in which combinations of each of the loads (N·m) of the engine, which are 20, 40, 60, 80, and 100 and each of the number of revolutions (rpm) of the engine, which are 800, 1600, 2400, 3200, and 4000 are operating conditions. In this case, there are 25 ways of the operating conditions. However, the actual measurements are performed under 13 ways of operation conditions as shaded in FIG. 2.

Third, a correction function for making simulation data obtained by the simulation model close to actual measurement data is derived based on the difference between the simulation data and the actual measurement data. Fourth, the simulation data calculated by the simulation model is corrected with the correction function, and thereby a final adaptive value is obtained. Namely, by combining the simulation model which is initially set and the correction function, a final model is generated.

Figure 3A:
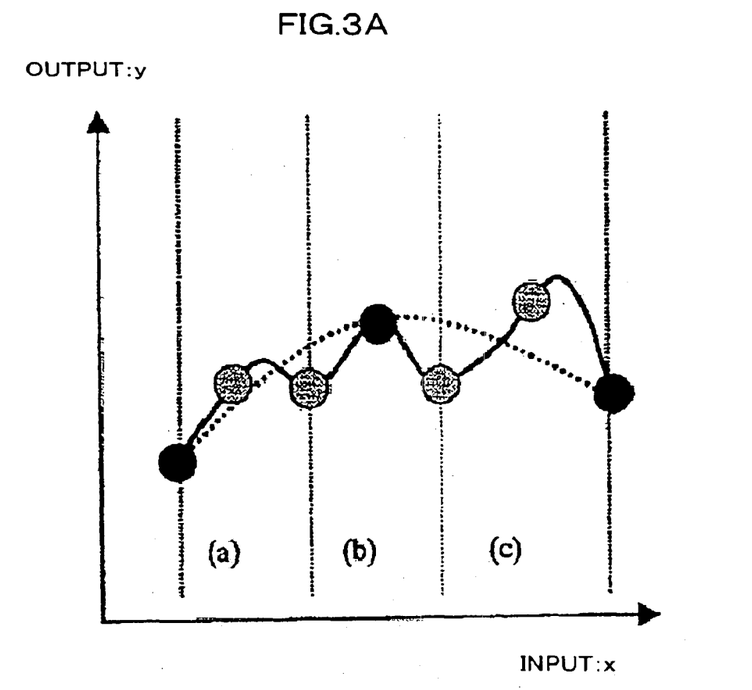
FIGS. 3A and 3B are conceptual diagrams for explaining the behavior of the final model.

FIGS. 3A and 3B are conceptual diagrams illustrating the behavior of the final model. The solid line shown in FIG. 3A shows the input/output characteristic of an object to be controlled, which is based on the final model. The black painted points denote actual measurement points, and shaded points are points to be interpolated at the time of generating the map M. The dotted line is a curve obtained by performing a statistical process such as the least-squares method on data at the measurement points. In this example, there are three actual measurement points and each two points are interpolated between the neighboring measurement points. From the curve (dotted line) obtained by the statistical process, a specific change by a pulse between the measurement points cannot be predicted. However, the pulse between the measurement points is reflected in the final model of this embodiment. This is due to the fact that the simulation model initially set is a physical model.

Figure 3B:
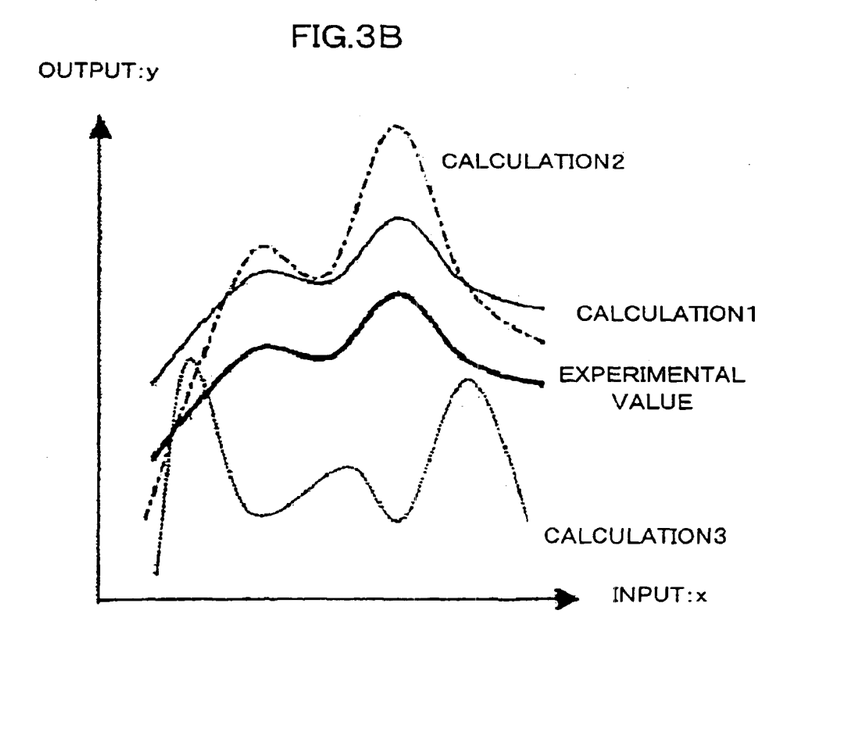

In the physical model, the physical properties of an object to be controlled are considered. Consequently, even if an experimental value and a calculation value do not perfectly coincide with each other, the tendencies of the behavior almost coincide with each other. Concretely, as shown in FIG. 3B, input values corresponding to peaks and valleys of an experimental value curve almost coincide with input values corresponding to peaks and valleys of simulation model curves (calculations 1 and 2). On the contrary, as shown by calculation 3, when the peaks and valleys of the curves are greatly deviated from each other, physical properties of an object to be controlled are not sufficiently considered in the simulation model.

According to the method, since a physical model in which physical properties of an object to be controlled are considered is adopted as a simulation model to be a base of the final model, pulses between the measurement points can be predicted. Therefore, without measuring all adaptive values to be stored in the map M with an actual apparatus, by measuring a part of the adaptive values by an actual apparatus, the final model is generated and all adaptive values can be obtained. As a result, the number of actual measurement processes can be greatly reduced, and a large-scaled complicated control system can be developed in a short time.

Figure 4:
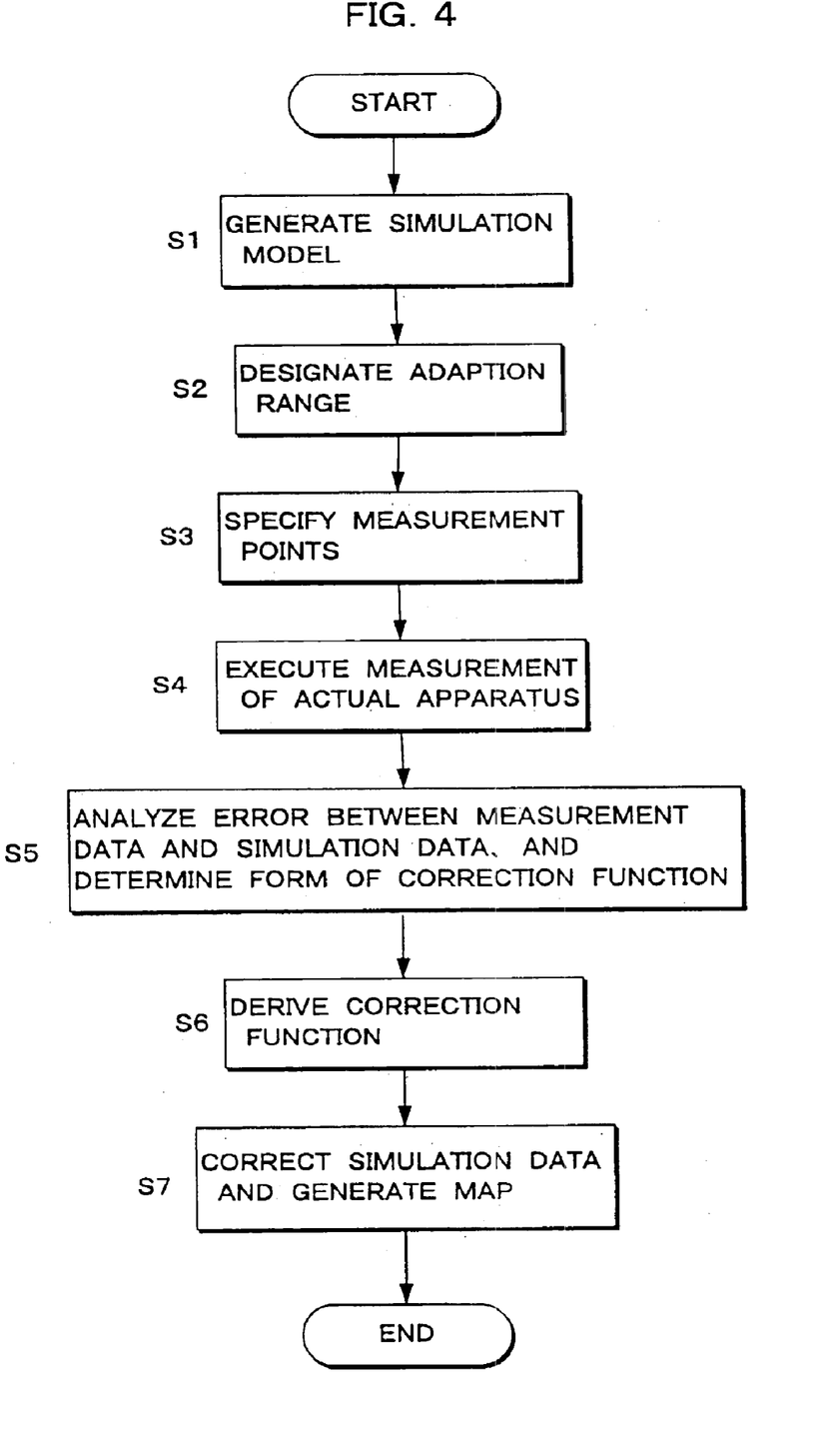
FIG. 4 is a flowchart showing the operation of the map generating system.

The operation of the map generating system will now be described concretely. In the following description, a case of generating the map M determining the relation between an intake pipe pressure and charging efficiency will be taken as an example. FIG. 4 shows a flowchart showing the operation of the map generating system. When the operator operates the input device 14 to start the map generating program, the CPU 10 executes a process of generating a simulation model (step S1). In the process, a simulation model of an intake/exhaust system of the engine 3 is generated. In the simulation model generating process, a physical model in which physical properties (such as the shape, thermal conductivity, and the like) of an object are considered is generated. The process is different from a process of simply connecting measurement points of actual measurement data by a statistical method to form a smooth curve.

More concretely, the operator inputs parameters in designing of the engine such as the number of cylinders and the length of a manifold, and thereby a simulation model is generated. Alternately, the CPU 10 reads out the elements of an engine which has been already designed and a simulation model is automatically generated. It is also possible to generate a simulation model by registering a plurality of blocks as a library, each of the blocks preliminarily designates the structure of each element, and properly combining the blocks on the screen of the display 15.

In the process of step S2, the adaptation range is designated. The adaptation range is a range of adaptive values described in the map M to be generated. In the process of step S3, measurement points in an actual apparatus are specified. In this process, all of measurement points necessary to generate the map M are not specified but some of the necessary measurement points are specified.

In the process of step S4, measurement of the engine 3 as an actual apparatus is executed. In this case, an instruction of instructing the measurement points specified in step S3 is transmitted from the computer 1 to the measuring apparatus 2. The measuring apparatus 2 operates the engine 3 in accordance with the instruction to obtain the measurement data and transmits the measurement data to the computer 1. As described above, the number of the measurement points is smaller than the number of adaptive values described in the map M, so that measurement time can be greatly shortened.

In the process of step S5, an error between the measurement data and the simulation data is analyzed and a correction function is derived. The correction function is expressed in the form of a mathematical expression such as a polynomial. An example of a mathematical expression other than a polynomial is $Err=X/(1+e^x)$. When the correction function is given as a polynomial, each of terms other than constants is given by a product of a variable indicative of a control condition or a variable indicative of the state of an object and a coefficient. The form of the correction function, that is, the term included in a polynomial is inputted by the operator. In this example, the correction function is given by the following equation 1.

$$Err=a+bNE+cIN+dEX+eIN/PM+gIN/NE+hEX/NE+iPM/KL \quad \text{Equation 1}$$

Each of a, b, c, d, e, f, g, h, and i denotes a coefficient to function as a parameter. NE, IN, EX, PM, and KL denotes the number of revolutions, the phase of an intake valve, the phase of an exhaust valve, intake pipe pressure, and charging efficiency respectively.

Figure 5:
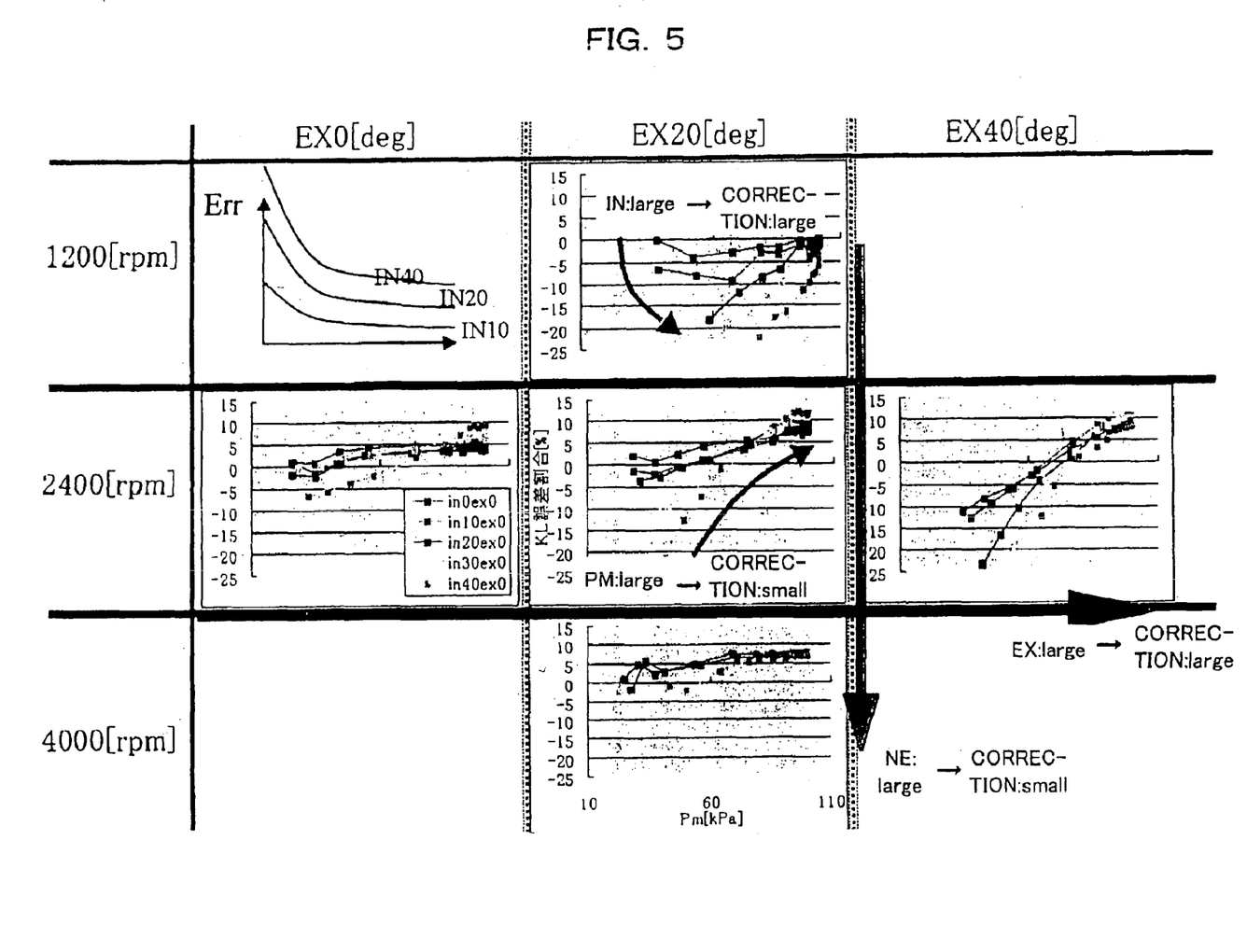
FIG. 5 is a conceptual diagram showing a screen displayed in the process of step S5 shown in FIG. 4.

When the operator inputs the correction function, the computer 1 displays a graph indicative of the tendency of an error on the display 15. FIG. 5 is a conceptual diagram showing the screen displayed in the process of step S5. In this example, first, there is a tendency that the larger the number NE of revolutions is, the smaller the correction amount is. Therefore, it is understood that the second term "bNE" of Equation 1 is useful for correction. There is also a tendency that the larger the phase EX of the exhaust valve is, the larger the correction amount is. It is consequently understood that the fourth term "dEX" is useful for correction. There is further a tendency that the larger the intake pipe pressure PM is, the smaller the correction amount is. It is consequently understood that a term in which a value is divided by PM like the fifth term "eIN/PM" of Equation 1 is useful for correction. By displaying graphs indicative of the input/output characteristics under various operating conditions as described above, the operator can grasp the tendency of an error and determine the form of the correction function.

Alternately, the CPU 10 may analyze the tendency of an error and determine the form of the correction function Err. In this case, first, a variable as an element of each of terms constructing the correction function Err is set. As the variable, each of factors of the operating condition (control condition) or a combination of the factors may be used. Examples of the variable are factors such as "NE", "IN", and "EX" or combinations of factors such as "IN/PM", "IN/NE", "EX/NE", and "PM/KL". Second, a correlation value between each of the valuables and error data is calculated. Third, the variable of which the correlation value is higher than a predetermined reference value is adopted as an element of the correction function Err. Fourth, a polynomial including terms each of which is constructed by a product of the selected variable and a parameter may be used as the form of a correction function. For example, in the case where it is determined that correlativity is high with respect to "NE", "EX", and "PM/KL", Err=bNE+dEX+iPM/KL is adopted as a correction function. In this case, "b", "d", and "i" are parameters.

The form of the correction function Err may be determined in advance. In the case where the correction function Err of an existing engine is already known and an engine as an object to be modeled is obtained only by changing a part of the existing engine, the form of the correction function Err used for generating a model of the existing engine may be adopted.

In the process of step S6, the correction function Err is derived. Concretely, the CPU 10 determines a coefficient as a parameter of the correction function Err determined in step S5. In this case, the parameter can be calculated by using a statistical process such as the least-squares method.

In step S7, the simulation model is corrected by using the correction function Err, and thereby a final model is obtained. Specifically, when the function indicative of the simulation model is fs(x) and the correction function is Err(x), the function indicative of the final model is given by a product or sum of fs(x) and Err(x). By substituting each of data values of the intake pipe pressure PM necessary to generate the map M for the final model obtained in such a manner, the charging efficiency KL is calculated. By associating the data value of the intake pipe pressure PM under a predetermined operating condition with the data value of the charging efficiency KL, the map M is generated. The map M generated in such a manner is written into a ROM as a component of the engine control unit (ECU) of a vehicle and is used for determining the opening/closing timings the lift amounts, or a fuel injection amount of the intake valve and the exhaust valve of the engine 3.

Figure 6:
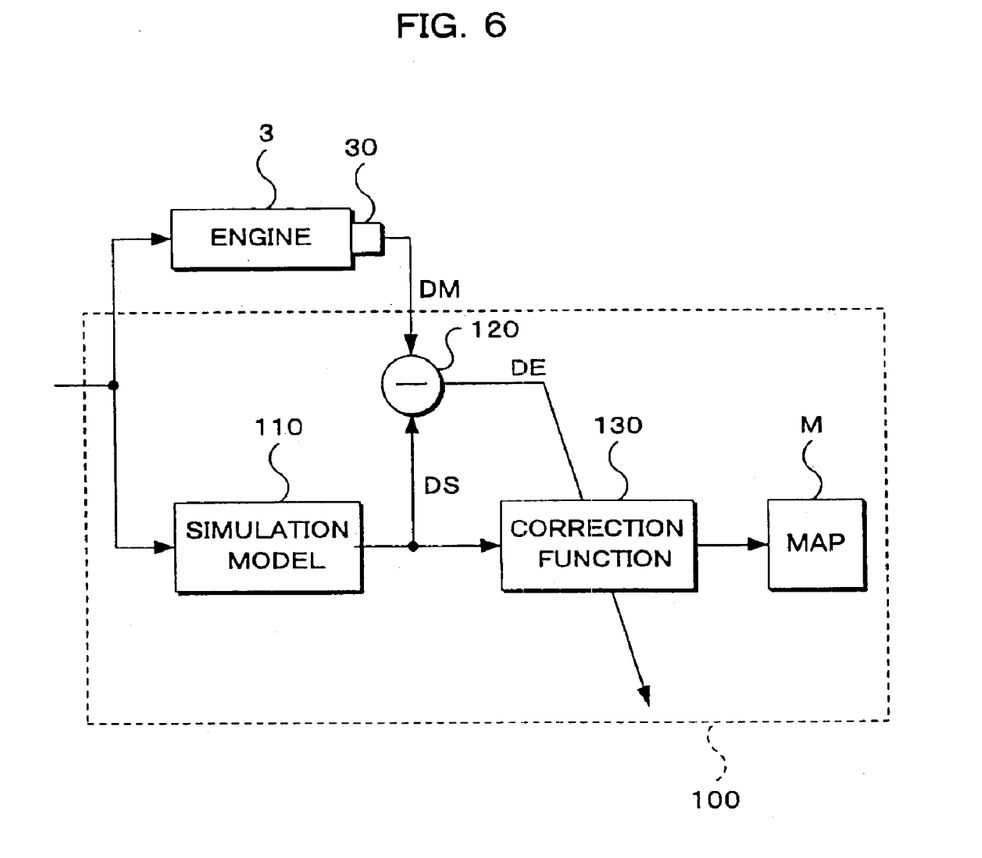
FIG. 6 is a block diagram showing an ECU and its peripheral configuration.

In the foregoing embodiment, the map M is preliminarily written in the ROM of the ECU. However, the invention is not limited to the method. Obviously, the map M may be generated and updated by the ECU itself. FIG. 6 is a block diagram showing such an ECU and the peripheral configuration. An ECU 100 stores a simulation model 110 and outputs simulation data DS according to the operating conditions by using the simulation model 110. The ECU 100 obtains actual measurement data DM based on an output signal from a sensor 30 attached to the engine 3, and calculates the difference between the measurement data DM and the simulation data DS by a subtractor 120, and thereby error data DE is generated. After that, based on the error data DE, the parameter of a correction function 130 is adjusted. The correction function 130 is expressed by, for example, a polynomial, its form is preliminarily determined, and its parameters are changeable. By performing a statistical process on the error data DE, generation/updating of the parameter is executed. The ECU 100 generates/updates an adaptive value of the map M by using the simulation model 110 and the correction function 130.

In an application example, the simulation model 110 and the correction function 130 are provided for a vehicle itself and the correction function 130 is generated/updated during traveling. Consequently, individual differences between vehicles and secular changes can be reflected in the map M. As a result, control of higher precision can be realized, so that drivability and fuel consumption can be improved and emission can be reduced. Since it is enough to obtain the simulation model 110 in consideration of physical properties of an object to be controlled, a map based on a physical model may be used. In this case, the computation load on the ECU 100 can be lessened and the computation capability can be used for adjustment of the parameters of the correction function 130.

Further, in the application example, the map M may be omitted. To be specific, in the ECU 100, the simulation model 110 functioning as a physical model and the correction function 130 are prestored. The operating conditions are input to the simulation model 110 and simulation data is calculated. Further, simulation data is input to the correction function 130, and thereby an adaptive value is calculated. In such a manner, data to be stored in the map M can be calculated in a real time manner.

Although the engine control apparatus using the model generating system and the model for an engine as a object to be controlled has been described above, the invention is not limited to the above. Anything can be adopted as the object to be controlled and the behavior of the object can be estimated from a final model.

As described above, according to the model generating method of the invention, a final model is generated by combining a physical model as a base with a correction function. Consequently, even if the number of measurement points of an actual apparatus is small, a final model of high precision can be generated. Therefore, the number of processes for actually measuring an object to obtain a final model can be greatly reduced.

What is claimed is:

1. A simulation apparatus for generating a model to estimate a state of an object under a predetermined control condition, comprising:

an error data generating device for calculating error data indicative of a difference between actual measurement data obtained by measuring a state of said object corresponding to input data and simulation data obtained by inputting said input data to a physical model in which physical properties of said object are considered;

a correction function generating device for generating a correction function to correct said simulation data so as to come close to said actual measurement data based on a change in said error data corresponding to said input data; and a final model generating device for generating a final model of said object by combining said physical model and said correction function.

2. The simulation apparatus according to claim 1, wherein said correction function generating device comprises:

a presenting device for presenting a change in said error data corresponding to said input data to a user and prompting the user to enter a form of said correction function;

an input device for outputting an output signal according to an operation of the user; and a parameter determining device for specifying the form of said correction function including at least one parameter based on said output signal and determining a value of said parameter so that correction data obtained by inputting said simulation data to said correction function comes close to said actual measurement data.

3. The simulation apparatus according to claim 1, wherein said correction function generating device stores a form of said correction function which is predetermined and includes at least one parameter, and determines a value of said parameter so that correction data obtained by inputting said simulation data to said correction function comes close to said actual measurement data.

4. The simulation apparatus according to claim 1, wherein said correction function generating device determines a form of said correction function including at least one parameter by a predetermined computation based on a change in said error data corresponding to said input data, and determines a value of said parameter so that correction data obtained by inputting said simulation data to said correction function comes close to said actual measurement data.

5. The simulation apparatus according to claims 1, further comprising an adaptation data generating device for inputting a control condition of said object to said final model and generating adaptation data indicative of the state of said object.

6. The simulation apparatus according to claim 5, wherein the number of pieces of said adaptation data generated by said adaptation data generating device is larger than the number of measurement points at which said actual measurement data is measured.

7. The simulation apparatus according to claim 5, wherein said object is an internal combustion engine for burning a fuel, and said control condition is an operating condition of said internal combustion engine.

8. A model generating program for generating a model to estimate a state of an object under a predetermined control condition, which allows a computer to execute the steps of:

calculating error data indicative of a difference between actual measurement data obtained by measuring a state of said object corresponding to input data and simulation data obtained by inputting said input data to a physical model in which physical properties of said object are considered;

deriving a correction function to correct said simulation data so as to come close to said actual measurement data based on a change in said error data corresponding to said input data; and generating a final model of said object by combining said physical model and said correction function.

9. A model generating method of generating a model to estimate a state of an object under a predetermined control condition, comprising the steps of:

calculating error data indicative of a difference between actual measurement data obtained by measuring a state of said object corresponding to input data and simulation data obtained by inputting said input data to a physical model in which physical properties of said object are considered;

deriving a correction function for correcting said simulation data so as to be close to said actual measurement data based on a change in said error data corresponding to said input data; and generating a final model of said object by combining said physical model and said correction function.

10. The model generating method according to claim 9, wherein the step of deriving said correction function includes the steps of:

determining a form of said correction function including at least one parameter based on a change in said error data corresponding to respect to said input data; and determining a value of said parameter so that correction data obtained by inputting said simulation data to said correction function comes close to said actual measurement data.

* * * * *